United States Patent [19]
Falke et al.

[11] Patent Number: 6,034,146
[45] Date of Patent: Mar. 7, 2000

[54] PREPARATION OF A STABLE DISPERSION OF MELAMINE IN POLYOL COMPONENTS

[75] Inventors: Peter Falke, Schwarzheide; Regina Hendreich, Frauendorf; Michael Reichelt, Ruhland, all of Germany

[73] Assignee: BASF Aktiengesellschaft, Ludwigshafen, Germany

[21] Appl. No.: 09/378,834

[22] Filed: Aug. 23, 1999

Related U.S. Application Data

[62] Division of application No. 08/949,599, Oct. 14, 1997.

[30] Foreign Application Priority Data

Oct. 12, 1996 [DE] Germany ............ 196 42 246

[51] Int. Cl.$^7$ ....................................... C08J 9/00
[52] U.S. Cl. .............................................. 521/128
[58] Field of Search ............................... 521/128

[56] References Cited

U.S. PATENT DOCUMENTS

| | | |
|---|---|---|
| 4,293,657 | 10/1981 | Nissen et al. . |
| 4,745,133 | 5/1988 | Grindbergs et al. . |
| 5,061,842 | 10/1991 | Payne . |
| 5,087,384 | 2/1992 | Horacek et al. . |
| 5,106,883 | 4/1992 | Horacek . |
| 5,118,721 | 6/1992 | Godoy et al. . |
| 5,125,952 | 6/1992 | Moore et al. . |
| 5,177,118 | 1/1993 | Dueber et al. . |
| 5,242,953 | 9/1993 | Madaj et al. . |
| 5,269,969 | 12/1993 | Madaj et al. . |
| 5,324,446 | 6/1994 | Madaj . |
| 5,506,278 | 4/1996 | Walmsley . |
| 5,536,757 | 7/1996 | Walmsley . |
| 5,569,682 | 10/1996 | Walmsley . |

FOREIGN PATENT DOCUMENTS

| | | |
|---|---|---|
| 0 358 427 | 3/1990 | European Pat. Off. . |
| 0 397 035 | 11/1990 | European Pat. Off. . |
| 288 828 A5 | 11/1989 | Germany . |
| WO 93/07193 | 4/1993 | WIPO . |

OTHER PUBLICATIONS

Polyurethane Division—SPI Sep. 26–29, 1995.

*Primary Examiner*—Morton Foelak
*Attorney, Agent, or Firm*—Fernando A. Borrego

[57] ABSTRACT

A stable dispersion of melamine in polyol components comprising at least one relatively high molecular weight compound containing at least two reactive hydrogen atoms and, if desired, low molecular weight chain extenders and/or crosslinkers, blowing agents, catalysts, flame retardants and also further auxiliaries and/or additives is prepared by using the melamine in combination with at least one amine and at least one organic and/or modified organic isocyanate. Such a dispersion can be used for producing flame-resistant polyurethane foams.

20 Claims, No Drawings

PREPARATION OF A STABLE DISPERSION OF MELAMINE IN POLYOL COMPONENTS

This application is a division of application Ser. No. 08/949,599, filed Oct. 14, 1997.

The present invention relates to a process for preparing a stable dispersion of melamine in polyol components, wherein the melamine is used in combination with at least one amine and at least one organic and/or modified organic isocyanate, a corresponding stable melamine dispersion and also a process for producing flame-resistant polyurethane foams.

The production of polyurethane foams by reacting organic and/or modified organic polyisocyanates or prepolymers with higher-functional compounds containing at least two reactive hydrogen atoms, for example polyoxyalkylenepolyamines and/or preferably organic polyhydroxyl compounds, in particular polyetherols having molecular weights of, for example, from 300 to 6000, and if desired chain extenders and/or crosslinkers having molecular weights of up to about 400 in the presence of catalysts, blowing agents, flame retardants, auxiliaries and/or additives is known and has been described many times. A summarizing overview of the production of polyurethane foams is given, for example, in Kunststoff-Handbuch, Vol. VII, "Polyurethane", 1st Edition, 1966, edited by Dr. R. Vieweg and Dr. A. Höchtlen and also 2nd Edition, 1983, and 3rd Edition, 1993, each edited by Dr. G. Oertel, Carl Hanser Verlag, Munich.

For many applications it is frequently necessary to provide polyurethane foams with flame retardants in order to minimize the fire danger associated with such materials. Apart from long-known halogen-containing flame retardants which are, in particular, undesirable for ecological reasons, melamine is a very useful and widely used flame retardant, particularly for flexible foams. However, a disadvantage is the fact that the melamine tends to settle out from the melamine-containing polyurethane components within a short time, which brings with it a series of technological problems.

The use of melamine as flame retardant is described in numerous publications (U.S. Pat. No. 4,745,133, EP-A-0351089, BE 903147). In all these applications it is necessary to process dispersions of melamine immediately after their preparation since the dispersions are not storage-stable and tend to settle.

For this reason, there have been many attempts in the past to prepare storage-stable melamine dispersions. Thus, as described in DD-A-288828, attempts have been made to alkoxylate melamine in order to hinder the sedimentation of the melamine modified in this way. This process step is complicated, prevents the sedimentation for only a short time and modifies the melamine structure in such a way that it greatly impairs the flame-retardant properties.

In WO 93/07193, melamine is added to a polymer polyol. With the aid of a silica preparation and a dispersant, dispersions which are stable on storage for up to 12 weeks are said to be obtained. It has to be taken into account here that such Aerosil preparations can have a detrimental influence on the foam structure.

In EP-A-0531850, polyfunctional acetoacetic acid derivatives are said to prevent settling of the melamine dispersion. An advantage stated is a formation of layers in the A component which is supposed to be able to be mixed up again by stirring.

In U.S. Pat. No. 5,125,952, use is made of thickeners known from the surface coatings industry, for example cellulose derivatives, in order to prevent settling of the melamine. Such additives have a detrimental influence on the viscosity and the foam structure.

According to EP-A-0391116, a storage-stable dispersion is said to be produced by addition of urea, thiourea and biuret derivatives, with the melamine in the polyetherol being stirred together with these additives. Compared with the polyurea polyols which are described by way of example in EP-A-0422797 and comprise dispersed urea particles partly grafted onto the polyol, the addition of the ureas is here carried out by separate mixing-in.

In EP-A-0439719, cyanuric acid derivatives are used for stabilizing melamine dispersions. This document claims the dispersion of melamine in a polyetherol. However, it is known that, in particular, the presence of water in the component has an extremely adverse effect on the stability of the dispersion.

In DE-A-2932304, use is made of very finely milled melamine in order to favorably influence the sedimentation behavior. Additions of acid, for example alkylsulfonic acids, have a favorable effect in this context.

Kageoka, Kodama and Tairaka (Polyurethane 1995, SPi Chicago, p. 62ff) confirm that use of finely milled melamine (average particle size 5 µm) produces a stable dispersion of melamine in a polyol even without additives. This is not achieved using a melamine in the particle size range from 10 to 50 µm. A disadvantage of this procedure is the high manufacturing cost for a melamine of this type.

EP-A-0358427 claims the production of polymer polyols (PHD, PIPA, Graft) in the presence of finely milled melamine (90% of the particles having a particle size of <15 µm). The melamine added in this way does not have an adverse effect on the process for producing the polymer polyol and is said to lead to an improved storage behavior.

In the case of the production of PHD polyols, this synthetic step comprises the initial charging of corresponding amine or hydrazine derivatives in the presence of melamine which are subsequently reacted with the isocyanate in a manner known per se to give a PHD polyol containing proportions of melamine.

In the production of PIPA polyols in the presence of melamine, alkanolamines are used in place of the amine or hydrazine derivatives.

EP-A-0422797 describes the preparation of a storage-stable melamine dispersion in an isocyanate or NCO prepolymer. For this purpose, the melamine is added to the isocyanate component and a urea dispersion in the isocyanate is produced by addition of amine constituents. A disadvantage is the relatively high viscosity of these dispersions.

It is an object of the present invention to develop a process for producing flame-resistant polyurethane foams in which melamine is used as flame retardant and the melamine forms a stable dispersion in the polyol component without the way the melamine is dispersed resulting in disadvantages in the processing of the foam system and the foam properties.

We have found that this object is achieved by making use, as flame retardant, of a dispersion of melamine in combination with at least one amine and at least one organic and/or modified organic isocyanate in the polyol component.

In our investigations, we have surprisingly found that storage-stable melamine dispersions in polyol components are obtained when these are admixed with specific amine derivatives, in particular primary amines, and this mixture is reacted with a small amount of isocyanate. The species which are formed here effectively prevent settling of the melamine, with a viscosity increase in the polyol component being noted. Since only small amounts of urea are produced, there is no temperature increase during preparation of the dispersion.

The present invention accordingly provides a process for preparing a stable dispersion of melamine in polyol components comprising at least one relatively high molecular weight compound containing at least two reactive hydrogen atoms and, if desired, low is molecular weight chain extenders and/or crosslinkers, blowing agents, catalysts, flame retardants and also further auxiliaries and/or additives, wherein use is made as flame retardant of melamine in combination with at least one amine and at least one organic and/or modified organic isocyanate, and also corresponding stable melamine dispersions.

The present invention further provides a process for producing flame-resistant polyurethane foams by reacting a) organic and/or modified organic isocyanates with b) at least one relatively high molecular weight compound containing at least two reactive hydrogen atoms and, if desired, c) low molecular weight chain extenders and/or crosslinkers in the presence of d) blowing agents, e) catalysts, f) flame retardants and, if desired, g) further auxiliaries and/or additives, wherein use is made as flame retardant of melamine in combination with at least one amine and at least one organic and/or modified organic isocyanate, and also provides for the use of the polyurethane foams thus produced as flexible foam for upholstery purposes in the furniture and automobile sectors, as sealing material in the building industry or as constituent of integral foams.

The stable dispersion of melamine in polyol components is produced according to the present invention by adding small amounts of specific amine derivatives to the constituents of the polyol component comprising at least one relatively high molecular weight compound containing at least two reactive hydrogen atoms (b), melamine and, if desired, low molecular weight chain extenders and/or crosslinkers (c), blowing agents (d), catalysts (e), further flame retardants (f) and also further auxiliaries and/or additives (g). This mixture is intimately mixed by stirring. A small amount of an isocyanate is added thereto and the whole mixture is mixed by stirring. In an advantageous embodiment, the mixture is stirred intensively at room temperature for about 20 minutes after addition of the isocyanates.

It is also possible to stir the isocyanate used into part of the base polyether prior to preparation of the dispersion and then to add the mixture to the melamine-containing polyol component with stirring.

It is likewise possible to mix the melamine-containing polyol component to which a suitable amine has been added according to the present invention with the isocyanate-containing component by means of a mixing nozzle.

If water is used as blowing agent, it has been found to be useful to add this to the polyol component not during the preparation of the dispersion but only later when making up the A component. Likewise, further constituents of the system can also be added later to the polyol component.

The melamine used according to the present invention as flame retardant can be used in commercial form. These products customarily have the following particle size distribution:

10% by weight of the particles are larger than 30 $\mu$m
30% by weight of the particles are larger than 24 $\mu$m
50% by weight of the particles are larger than 20 $\mu$m
70% by weight of the particles are larger than 16 $\mu$m
90% by weight of the particles are larger than 11 $\mu$m Melamine having an average particle size of from 1 to 100 $\mu$m, in particular from 10 to 50 $\mu$m, and a bulk density of from 300 to 800 g/liter, in particular from 500 to 650 g/liter, has been found to be particularly useful and is therefore preferably used. The proportion of melamine in the polyol component is advantageously from 1 to 50% by weight, preferably from 3 to 25% by weight.

According to the present invention, amines used are preferably primary and/or secondary amines, particularly preferably primary amines. These amines should be polyfunctional, but can also contain proportions of monofunctional amines. Preference is given to using aliphatic and/or cycloaliphatic amines. The amine derivatives can contain further functional groups such as —OH or —SH. Likewise, proportions of alkanolamines and amine mixtures can also be used.

Examples which may be mentioned are: hexamethylenediamine, ethylenediamine, 4,4'-methylenebiscyclohexylamine, diethyltolylenediamine, methylenedianiline, $NH_2$-containing polyols such as Jeffamine grades, 3,3'-imidopropylamine, fatty amines, diethylenetriamine, triethylenetetramine, propylenediamines, butylenediamines, diethanolamine and ethanolamine.

Furthermore, according to the present invention, it is also possible to use the aromatic amines customary in polyurethane chemistry, for example tolylenediamines, in particular diethyltolylenediamine, or amines of the diphenylmethane series.

Preference is given to using 2,2'-dimethyl-4,4'-methylenebiscyclohexylamine, coconut fatty amine and N-oleylpropylenediamine.

The amines are used in amounts of from 0.05 to 5% by weight, preferably from 0.5 to 2.0% by weight, based on the weight of the polyol component.

The melamine-containing polyol component to which the appropriate primary or secondary amine has been added is then admixed with stirring or using another suitable mixing technique with at least one organic and/or modified organic isocyanate. For this purpose, it is in principle possible to use all isocyanates listed below as component (a). However, preference is given to using aromatic isocyanates, particularly preferably tolylene 2,4- and 2,6-diisocyanates, diphenylmethane 4,4'- and 2,2'-diisocyanates, polyphenylpolymethylene polyisocyanates and prepolymers containing NCO groups as well as mixtures of these.

The organic and/or modified organic isocyanates are here used in amounts of from 0.05 to 5% by weight, preferably from 0.5 to 2.0% by weight, based on the weight of the polyol component.

Particularly stable melamine-containing polyol components are obtained when from 5 to 25% by weight of melamine, from 0.5 to 2.0% by weight of amine and from 0.5 to 2.0% by weight of isocyanate are mixed with the other constituents of the polyol component.

The reaction which occurs after addition of the organic and/or modified organic isocyanates is indicated by a viscosity increase.

In the preparation according to the present invention of the melamine dispersion, there is only very little settling of the melamine in the polyol component. The polyol component has been able to be kept for at least three months with very little, if any, settling of melamine. The stirring-up of the polyol component which is otherwise necessary before processing was not required. Moreover, no melamine sediments were obtained in the drums and in the containers of the apparatus.

The flame-resistant polyurethane foams are produced in a manner known per se by reacting a) organic and/or modified organic isocyanates with b) at least one relatively high molecular weight compound containing at least two reactive hydrogen atoms and, if desired, c) low molecular weight chain extenders and/or crosslinkers in the presence of d) blowing agents, e) catalysts, f) flame retardants and, if desired, g) further auxiliaries and/or additives, wherein, as described above, use is made as flame retardant of melamine in combination with at least one amine and at least one organic and/or modified organic isocyanate. The melamine is here present as a stable dispersion in the polyol component comprising the components (b) and, if desired, (c), (d), (e), further flame retardants (f) and (g).

As regards the starting components which can be used for the process of the present invention, the following may be said:

a) Suitable organic and/or modified organic isocyanates for producing the polyurethanes of the present invention and for stabilizing the melamine in the polyol component are the aliphatic, cycloaliphatic, araliphatic and preferably aromatic polyfunctional isocyanates known per se.

Specific examples are: alkylene diisocyanates having from 4 to 12 carbon atoms in the alkylene radical, for example dodecane 1,12-diisocyanate, 2-ethyltetramethylene 1,4-diisocyanate, 2-methylpentamethylene 1,5-diisocyanate, tetramethylene 1,4-diisocyanate and preferably hexamethylene 1,6-diisocyanate; cycloaliphatic diisocyanates such as cyclohexane 1,3- and 1,4-diisocyanate and also any mixtures of these isomers, 1-isocyanato-3,3,5-trimethyl-5-isocyanatomethylcyclohexane (IPDI), hexahydrotolylene 2,4- and 2,6-diisocyanate and also the corresponding isomer mixtures, dicyclohexylmethane 4,4'-, 2,2'- and 2,4'-diisocyanate and also the corresponding isomer mixtures, preferably aromatic diisocyanates and polyisocyanates such as tolylene 2,4- and 2,6-diisocyanate and the corresponding isomer mixtures, diphenylmethane 4,4'-, 2,4'- and 2,2'-diisocyanate and the corresponding isomer mixtures, mixtures of diphenylmethane 4,4'- and 2,4'-diisocyanates, polyphenylpolymethylene polyisocyanates, mixtures of diphenylmethane 4,4'-, 2,4'- and 2,2'-diisocyanates and polyphenylpolymethylene polyisocyanates (raw MDI) and mixtures of raw MDI and tolylene diisocyanates. The organic diisocyanates and polyisocyanates can be used individually or in the form of their mixtures.

Use is frequently also made of modified polyfunctional isocyanates and prepolymers ie. products which are obtained by chemical reaction of organic diisocyanates and/or polyisocyanates. Examples which may be mentioned are diisocyanates and/or polyisocyanates containing ester, urea, biuret, allophanate, carbodiimide, isocyanurate, uretdione and/or urethane groups. Specific examples of suitable modified polyfunctional isocyanates are:

Prepolymers containing urethane groups and having an NCO content of from 14 to 2.8% by weight, preferably from 12 to 3.5% by weight, or pseudoprepolymers having an NCO content of from 45 to 14% by weight, preferably from 34 to 22% by weight, where urethane-modified polyisocyanates derived from tolylene diisocyanates have, in particular, an NCO content of from 40 to 28% by weight and those derived from diphenylmethane 4,4'-diisocyanate, diphenylmethane 4,4'- and 2,4'-diisocyanate isomer mixtures or raw MDI have, in particular, an NCO content of from 30 to 14% by weight, particularly preferably from 28 to 22% by weight, based on the total weight, and are prepared, for example, by reacting diols, oxalkylene glycols and/or polyoxyalkylene glycols having molecular weights of from 62 to 6000, preferably from 134 to 4200, with tolylene diisocyanates, diphenylmethane 4,4'-diisocyanate, diphenylmethane diisocyanate isomer mixtures and/or raw MDI, for example at from 20 to 110° C., preferably from 50 to 90° C., with examples of oxalkylene and polyoxyalkylene glycols which can be used individually or as mixtures being: diethylene, dipropylene, polyoxyethylene, polyoxypropylene and polyoxypropylene-polyoxyethylene glycols, polyisocyanates containing carbodiimide groups and/or uretonimine groups, for example on the basis of diphenylmethane diisocyanate isomers and/or tolylene diisocyanate. Also suitable are mixtures of tolylene 2,4-diisocyanate or tolylene 2,4- and 2,6-diisocyanate mixtures modified with urethane groups and diphenylmethane 4,4'-diisocyanate, diphenylmethane diisocyanate isomer mixtures and/or raw MDI, mixtures of diphenylmethane 4,4'-diisocyanate, diphenylmethane diisocyanate isomer mixtures, preferably of diphenylmethane 4,4'- and 2,4'-diisocyanate, or raw MDI modified with urethane groups and tolylene 2,4-diisocyanate or tolylene 2,4- and 2,6-diisocyanate mixtures and mixtures of tolylene 2,4-diisocyanate or tolylene 2,4- and 2,6-diisocyanate mixtures modified with urethane groups and diphenylmethane 4,4'-diisocyanate, diphenylmethane diisocyanate isomer mixtures, preferably of diphenylmethane 4,4'- and 2,4'-diisocyanate, and/or raw MDI modified with urethane groups, with the modification of the diphenylmethane 4,4'-diisocyanate and the polyisocyanate mixtures of tolylene diisocyanate, diphenylmethane diisocyanate and raw MDI preferably being carried out using difunctional and/or trifunctional polyoxypropylene and/or polyoxypropylene-polyoxyethylene polyols having molecular weights of from 134 to 4200, preferably from 1800 to 4200.

Organic polyisocyanates which have been found to be particularly useful and are therefore preferably used are: mixtures of tolylene diisocyanates and raw MDI or mixtures of modified organic polyisocyanates containing urethane groups and having an NCO content of from 33.6 to 15% by weight, in particular those based on tolylene diisocyanates, diphenylmethane 4,4'-diisocyanate, diphenylmethane diisocyanate isomer mixtures or raw MDI and particularly raw MDI having a diphenylmethane diisocyanate isomer content of from 30 to 80% by weight, preferably from 30 to 55% by weight.

b) Relatively high molecular weight compounds containing at least two reactive hydrogen atoms which are used are advantageously those having a functionality of from 2 to 4, preferably from 2 to 3, and a molecular weight of from 300 to 8000, preferably from 300 to 5000.

Relatively high molecular weight compounds which have been found to be useful are, for example, polyetherpolyamines and/or preferably polyols selected from the group consisting of polyether polyols, polyester polyols, polythioether polyols, polyesteramides, hydroxyl-containing polyacetals and hydroxyl-containing aliphatic polycarbonates or mixtures of at least two of the polyols mentioned. Preference is given to using polyester polyols and/or polyether polyols. The hydroxyl number of the polyhydroxyl compounds is here generally from 20 to 80 and preferably from 28 to 56.

Suitable polyester polyols can be prepared, for example, from organic dicarboxylic acids having from 2 to 12 carbon atoms, preferably aliphatic dicarboxylic acids having from 4 to 6 carbon atoms, and polyhydric alcohols, preferably diols, having from 2 to 12 carbon atoms, preferably from 2 to 6 carbon atoms. Examples of suitable dicarboxylic acids are: succinic acid, glutaric acid, adipic acid, suberic acid, azelaic acid, sebacic acid, decanedicarboxylic acid, maleic acid, fumaric acid, phthalic acid, isophthalic acid and terephthalic acid. The dicarboxylic acids can be used either individually or in admixture with one another. In place of the free dicarboxylic acids, it is also possible to use the corresponding dicarboxylic acid derivatives such as dicarboxylic esters of alcohols having from 1 to 4 carbon atoms or dicarboxylic anhydrides. Preference is given to using dicarboxylic acid mixtures of succinic, glutaric and adipic acid in weight ratios of, for example, 20–35:35–50:20–32 and in particular adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol and 1,6-hexanediol. It is also possible to use polyester polyols derived from lactones, eg. ε-caprolactone, or hydroxycarboxylic acids, eg. ω-hydroxycaproic acid.

To prepare the polyester polyols, the organic, for example aromatic and preferably aliphatic, polycarboxylic acids and/or derivatives and polyhydric alcohols can be polycondensed in the absence of catalysts or preferably in the presence of esterification catalysts, advantageously in an atmosphere of inert gas such as nitrogen, carbon monoxide, helium, argon, etc, in the melt at from 150 to 250° C., preferably from 180 to 220° C., under atmospheric or reduced pressure to the desired acid number which is advantageously less than 10, preferably less than 2. According to a preferred embodiment, the esterification mixture is polycondensed at the abovementioned temperatures to an acid number of from 80 to 30, preferably from 40 to 30, under atmospheric pressure and subsequently under a pressure of less than 500 mbar, preferably from 50 to 150 mbar. Examples of suitable esterification catalysts are iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene for azeotropically distilling off the water of condensation.

To prepare the polyester polyols, the organic polycarboxylic acids and/or derivatives and polyhydric alcohols are advantageously polycondensed in a molar ratio of 1:1–1.8, preferably 1:1.05–1.2. The polyester polyols obtained preferably have a functionality of from 2 to 4, in particular from 2 to 3, and a molecular weight of from 480 to 3000, in particular from 600 to 2000.

However, polyols which are particularly preferably used are polyether polyols which are prepared by known methods, for example from one or more alkylene oxides having from 2 to 4 carbon atoms in the alkylene radical by anionic polymerization using alkali metal hydroxides such as sodium or potassium hydroxide, or alkali metal alkoxides such as sodium methoxide, sodium or potassium ethoxide or potassium isopropoxide as catalysts and with addition of at least one initiator molecule containing from 2 to 4, preferably 2 or 3, reactive hydrogen atoms in bonded form, or by cationic polymerization using Lewis acids such as antimony pentachloride, boron fluoride etherate, etc, or bleaching earth as catalysts.

For specific applications, it is also possible for monofunctional initiators to be incorporated into the polyether structure. Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, alternately in succession or as mixtures.

Suitable initiator molecules are, for example: water, organic dicarboxylic acids such as succinic acid, adipic acid, phthalic acid and terephthalic acid, aliphatic and aromatic, unalkylated, N-monoalkylated, N,N- or N,N'-dialkylated diamines having from 1 to 4 carbon atoms in the alkyl radical, for example monoalkylated and dialkylated ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, phenylenediamine, 2,3-, 2,4- and 2,6-tolylenediamine and 4,4'-, 2,4'- and 2,2'-diaminodiphenylmethane. Further suitable initiator molecules are: alkanolamines such as ethanolamine, N-methylethanolamine and N-ethylethanolamine, dialkanolamine such as diethanolamine, N-methylethanolamine and N-ethyldiethanolamine, and trialkanolamines such as triethanolamine, and ammonia. Preference is given to using polyhydric, in particular dihydric and/or trihydric alcohols such as ethanediol, 1,2- and 2,3-propanediol, diethylene glycol, dipropylene glycol, 1,4-butanediol, 1,6-hexanediol, glycerol, trimethylolpropane and pentaerythritol.

The polyether polyols, preferably polyoxypropylene and polyoxypropylene-polyoxyethylene polyols, have a functionality of preferably from 2 to 4 and in particular from 2 to 3 and molecular weights of from 300 to 8000, preferably from 300 to 6000 and in particular from 1000 to 5000, and suitable polyoxytetramethylene glycols have a molecular weight of up to about 3500.

Further suitable polyether polyols are polymer-modified polyether polyols, preferably graft polyether polyols, in particular those based on styrene and/or acrylonitrile which are prepared by in situ polymerization of acrylonitrile, styrene or preferably mixtures of styrene and acrylonitrile, for example in a weight ratio of from 90:10 to 10:90, preferably from 70:30 to 30:70, advantageously in the abovementioned polyether polyols using methods similar to those described in the German Patents 1111394, 1222669 (U.S. Pat. Nos. 3,304,273, 3,383,351, 3,523,093), 1 152 536 (GB 1 040 452) and 1 152 537 (GB 987 618), and also polyether polyol dispersions which contain as dispersed phase, usually in an amount of from 1 to 50% by weight, preferably from 2 to 25% by weight: eg. polyureas, polyhydrazides, polyurethanes containing bonded tertiary amino groups and/or melamine and which are described, for example, in EP-B-011752 (U.S. Pat. No. 4,304,708), U.S. Pat. No. 4,374,209 and DE-A-3231497.

The polyether polyols can, like the polyester polyols, be used individually or in the form of mixtures. They can also be mixed with the graft polyether polyols or polyester polyols or with the hydroxyl-containing polyesteramides, polyacetals, polycarbonates and/or polyetherpolyamines.

Suitable hydroxyl-containing polyacetals are, for example, the compounds which can be prepared from glycols such as diethylene glycol, triethylene glycol, 4,4'-dihydroxyethoxydiphenyldimethylmethane, hexanediol and formaldehyde. Suitable polyacetals can also be prepared by polymerization of cyclic acetals.

Suitable hydroxyl-containing polycarbonates are those of the type known per se which can be prepared, for example, by reacting diols such as 1,3-propanediol, 1,4-butanediol and/or 1,6-hexanediol, diethylene glycol, triethylene glycol or tetraethylene glycol with diaryl carbonates eg. diphenyl carbonate, or phosgene.

The polyesteramides include, for example, the predominantly linear condensates obtained from polybasic, saturated and/or unsaturated carboxylic acids or their anhydrides and polyfunctional saturated and/or unsaturated aminoalcohols or mixtures of polyfunctional alcohols and aminoalcohols and/or polyamines.

Suitable polyetherpolyamines can be prepared from the abovementioned polyether polyols by known methods. Examples which may be mentioned are the cyanoalkylation of polyoxyalkylene polyols and subsequent hydrogenation of the nitrile formed (U.S. Pat. No. 3,267,050) or the partial or complete amination of polyoxyalkylene polyols with amines or ammonia in the presence of hydrogen and catalysts (DE-A-12 15 373).

c) The polyurethane foams of the present invention can be produced with or without concomitant use of chain extenders and/or crosslinkers. However, the addition of chain extenders, crosslinkers or, if desired, mixtures thereof can prove to be advantageous for modifying the mechanical properties, eg. the hardness. Chain extenders and/or crosslinkers used are diols and/or triols having molecular weights of less than 400, preferably from 60 to 300. Examples of suitable chain extenders/crosslinkers are aliphatic, cycloaliphatic and/or araliphatic diols having from 2 to 14, preferably from 4 to 10, carbon atoms, for example ethylene glycol, 1,3-propanediol, 1,10-decanediol, o-, m- or p-dihydroxycyclohexane, diethylene glycol, dipropylene glycol and preferably 1,4-butanediol, 1,6-hexanediol and bis(2-hydroxyethyl)hydroquinone, triols such as 1,2,4- or 1,3,5-trihydroxycyclohexane, glycerol and trimethylolpropane and low molecular weight hydroxyl-containing polyalkylene oxides based on ethylene and/or 1,2-propylene oxide and the abovementioned diols and/or triols as initiator molecules.

If chain extenders, crosslinkers or mixtures thereof are employed for producing the polyurethane foams, these are advantageously used in an amount of from 0 to 20% by weight, preferably from 1 to 8% by weight, based on the weight of the component (b).

d) Blowing agents which can be used are the chlorofluorocarbons (CFCs) generally known from polyurethane chemistry and also highly fluorinated and/or perfluorinated hydrocarbons. However, for ecological reasons, the use of these materials is being greatly restricted or completely stopped. Besides the HCFCs and HFCs, alternative blowing agents which can be used are, in particular, aliphatic and/or cycloaliphatic hydrocarbons, particularly pentane and cyclopentane or acetals such as methylate.

These physical blowing agents are usually added to the polyol component of the system. However, they can also be added to the isocyanate component or as a combination both to the polyol component and to the isocyanate component.

They can also be used together with highly fluorinated and/or perfluorinated hydrocarbons in the form of an emulsion of the polyol component. If emulsifiers are used, they are usually oligomeric acrylates containing bonded polyoxyalkylene and fluoroalkane radicals as side groups and having a fluorine content of from about 5 to 30% by weight. Such products are sufficiently well known from polymer chemistry, eg. EP-A-0 351 614.

The amount of blowing agent or blowing agent mixture used is from 1 to 25% by weight, preferably from 1 to 15% by weight, in each case based on the component (b).

Furthermore, it is possible and customary to add water as blowing agent to the formative component (b) in an amount of from 0.5 to 15% by weight, preferably from 1 to 5% by weight, based on the component (b). The addition of water can be combined with the use of the other blowing agents described.

e) Catalysts used for producing the polyurethane foams of the present invention are the catalysts customary in polyurethane chemistry. In particular, use is made of compounds which strongly accelerate the reaction of the compounds containing reactive hydrogen atoms, in particular hydroxyl groups, of the component (b) and, if used, (c) with the organic, modified or unmodified organic isocyanates (a). Suitable catalysts are organic metal compounds such as iron(II) chloride, zinc chloride, lead octoate and preferably organic tin compounds such as tin(II) salts of organic carboxylic acids, eg. tin(II) acetate, tin(II) octoate, tin(II) ethylhexanoate and tin(II) laurate, and dialkyltin(IV) salts of organic carboxylic acids, eg. dibutyltin diacetate, dibutyltin dilaurate, dibutyltin maleate and dioctyltin diacetate. The organic metal compounds are used alone or preferably in combination with strongly basic amines. Examples which may be mentioned are amidines such as 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N', N'-tetramethylethylenediamine, N,N,N',N'-tetramethylbutanediamine, N,N,N',N'-tetramethylhexane- 1,6-diamine, pentamethyldiethylenetriamine, bis (dimethylaminoethyl)ether, bis(dimethylaminopropyl) urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyldiethanolamine and N-ethyldiethanolamine and dimethylethanolamine. Other suitable catalysts are: tris(dialkylaminoalkyl)-s-hexahydrotriazines, in particular tris(N,N-dimethylaminopropyl)-s-hexahydrotriazine, tetraalkylammonium hydroxides such as tetramethylammonium hydroxide, alkali metal hydroxides such as sodium hydroxide, and alkali metal alkoxides such as sodium methoxide and potassium isopropoxide, and also alkali metal salts of long-chain fatty acids having from 10 to 20 carbon atoms and possibly lateral OH groups.

Preference is given to using from 0.001 to 5% by weight, in particular from 0.05 to 2% by weight, of catalyst or catalyst combination, based on the weight of the formative component (b).

f) According to the present invention, melamine in combination with at least one amine and at least one organic and/or modified organic isocyanate, as described above, is used as flame retardant for producing the flame-resistant polyurethane foams. The melamine is here present as a stable dispersion in the polyol component comprising the components (b), if desired, (c), (d), (e), further flame retardants (f) and (g).

The polyurethane foams are preferably made flame-resistant using only the flame retardant combination described. Naturally, amounts of further flame retardants can also be used.

If further flame retardants are used, suitable flame retardants for this purpose are, for example, tris(2-chloroethyl)phosphate, tris(2-chloropropyl)phosphate, tetrakis(2-chloroethyl)ethylene diphosphate, dimethyl methane phosphonate, diethyl diethanolaminomethylphosphonate and also commercial halogen-containing flame retardant polyols. Apart from the halogen-substituted phosphates mentioned, it is also possible to use inorganic or organic flame retardants such as red phosphorus, hydrated aluminum oxide, ammonium polyphosphate and calcium sulfate, expanded graphite or cyanuric acid derivatives.

In general, it has been found to be advantageous to use from 1 to 40 parts by weight of the flame retardants mentioned per 100 parts by weight of the formative component (b).

g) If desired, further auxiliaries and/or additives can be incorporated into the reaction mixture for producing the polyurethane foams. Examples which may be mentioned are surface-active substances, foam stabilizers, cell regulators, fillers, dyes, pigments, hydrolysis inhibitors, fungistatic and bacteriostatic substances.

Suitable surface-active substances are, for example, compounds which serve to aid the homogenization of the starting materials and may also be suitable for regulating the cell structure of the plastics. Examples which may be mentioned are emulsifiers such as the sodium salts of castor oil sulfates or of fatty acids and also amine salts of fatty acids, eg. diethylamine oleate, diethanolamine stearate, diethanolamine ricinoleate, salts of sulfonic acids such as alkali metal or ammonium salts of dodecylbenzene- or dinaphthyl-methanedisulfonic acid and ricinoleic acid, foam stabilizers such as siloxane-oxalkylene copolymers and other organopolysiloxanes, ethoxylated alkylphenols, ethoxylated fatty alcohols, paraffin oils, castor oil or ricinoleic esters, Turkey red oil and peanut oil, and cell regulators such as paraffins, fatty alcohols and dimethylpolysiloxanes. Also suitable for improving the emulsifying action, the cell structure and/or stabilizing the foam are the above described oligomeric acrylates having polyoxyalkylene and fluoroalkane radicals as side groups. The surface-active substances are usually employed in amounts of from 0.01 to 5 parts by weight, based on 100 parts by weight of the formative component (b).

For the purposes of the present invention, fillers, in particular reinforcing fillers, are the customary organic and inorganic fillers, reinforcers, weighting agents, agents for improving the abrasion behavior in paints, coating compositions, etc. Specific examples are: inorganic fillers such as siliceous minerals, for example sheet silicates such as antigorite, serpentine, hornblendes, amphiboles, chrysotile and talc, metal oxides such as kaolin, aluminum oxides, titanium oxides and iron oxides, metal salts such as chalk, barite and inorganic pigments such as cadmium sulfide and zinc sulfide, and also glass, etc. Preference is given to using kaolin (china clay), aluminum silicate and coprecipitors of barium sulfate and aluminum silicate and also natural and synthetic fibrous minerals such as wollastonite, metal and in particular glass fibers of various lengths which may, if desired, be coated with a size. Examples of suitable organic fillers are: carbon, rosin, cyclopentadienyl resins and graft polymers as well as cellulose fibers, polyamide, polyacrylonitrile, polyurethane and polyester fibers based on aromatic and/or aliphatic dicarboxylic esters and, in particular, carbon fibers.

The inorganic and organic fillers can be used individually or as mixtures and are advantageously incorporated into the reaction mixture in amounts of from 0.5 to 50% by weight, preferably from 1 to 40% by weight, based on the weight of the components (a) to (c), although the content of mats, non-wovens and woven fabrics of natural and synthetic fibers can be up to 80% by weight.

Further details regarding the abovementioned other customary auxiliaries and additives may be found in the specialist literature, for example the monograph by J. H. Saunders and K. C. Frisch, "High Polymers" Volume XVI, Polyurethanes, Parts 1 and 2, Interscience Publishers 1962 and 1964, or the Kunststoffhandbuch, Polyurethane, Volume VII, Hanser-Verlag, Munich, Vienna, 1st, 2nd and 3rd Editions, 1966, 1983 and 1993.

To produce the polyurethane foams, the organic and/or modified organic isocyanates (a), relatively high molecular weight compounds containing at least two reactive hydrogen atoms (b) and, if desired, chain extenders and/or crosslinkers (c) are reacted in amounts such that the equivalence ratio of NCO groups of the isocyanates (a) to the sum of the reactive hydrogen atoms of the components (b) and, if used, (c) is 0.80–1.25:1, preferably 0.90–1.15:1.

The polyurethane foams are preferably produced by the one-shot process, for example by means of the high-pressure or low-pressure technique in open or closed molds, for example metal molds. Also customary is the continuous application of the reaction mixture to suitable conveyor belts for producing foam blocks.

It has been found to be particularly advantageous to employ the two-component method and to combine the stable melamine dispersion of the present invention, comprising the components (b) and, if desired, (c), (d), (e), further flame retardants (f) and (g), with, if desired, further relatively high molecular weight compounds containing at least two reactive hydrogen atoms (b), low molecular weight chain extenders and/or crosslinkers (c), blowing agents (d), catalysts (e), flame retardants (f) and auxiliaries and/or additives (g) to form the component (A) and to use the organic and/or modified organic isocyanates (a), if desired in admixture with further flame retardants (f) and auxiliaries and/or additives (g) as component (B).

The components (A) and (B) are mixed at from 15 to 90° C., preferably from 20 to 60° C. and in particular from 20 to 40° C., and introduced into the open mold or possibly under increased pressure into the closed mold or, in the case of a continuous workstation, applied to a belt which accommodates the reaction mixture. Mixing can, as has already been disclosed, be carried out mechanically by means of a stirrer, by means of a stirring screw or by high-pressure mixing in a nozzle. The mold temperature is advantageously from 20 to 110° C., preferably from 30 to 70° C. and in particular from 35 to 55° C.

The polyurethane foams produced by the process of the present invention have a density of from 10 to 800 kg/m$^3$, preferably from 35 to 100 kg/m$^3$ and in particular from 25 to 80 kg/m$^3$. They are particularly suitable as upholstery material in the furniture and automobile sectors, in particular for producing vehicle seats. They can also be employed as flexible sealing material in the building industry. With correspondingly higher bulk densities, they can likewise be used as integral foam parts in the vehicle safety area.

The present invention is illustrated by the examples below.

EXAMPLE 1

Comparative Example

| 100 parts by weight (pbw) of an A component comprising | |
|---|---|
| Constituent | pbw |
| Lupranol ® 2045 | 64.55 |
| Lupranol ® 2030 | 6.20 |
| Lupranol ® 2047 | 5.00 |
| Lupragen ® N211 | 0.30 |
| Lupragen ® N201 | 0.20 |
| VP 9199 | 0.45 |
| B 8680 | 0.20 |
| Systol ® T 131 | 5.00 |
| Water | 3.10 |
| Melamine | 15.00 |

Lupranol® 2045—OHN 35 mg KOH/g, polyether based on ethylene oxide and propylene oxide (BASF); Lupranol® 2030—OHN 55 mg KOH/g, polyether based on ethylene oxide and propylene oxide (BASF); Lupranol® 2047—OHN 42 mg KOH/g, polyether based on ethylene oxide and propylene oxide (BASF); Lupragen® N211, N201, VP 9199—amine catalysts (BASF); B 8680—silicone stabilizer (Goldschmidt); Systol® T 131—phosphorus-containing flame retardant (BASF); melamine, particle size 10–50 μm (90%) (BASF), were reacted with 61 pbw of an NCO containing prepolymer based on Lupranat® MES, Lupranat® MI and Lupranat® M20A (NCO content: 27.0% by weight) to give a flexible polyurethane foam (Table 1).

Lupranat® MES: diphenylmethane 4,4'-diisocyanate,
Lupranat® MI: mixture of diphenylmethane 2,4'- and 4,4'-diisocyanate
Lupranat® M20A: polyphenyl polyisocyanate

EXAMPLE 2

| 0.5 pbw of 2,2'-dimethyl-4,4'-methylenebiscyclohexylamine was added to 96.6 pbw of a component comprising | |
|---|---|
| Constituent | pbw |
| Lupranol ® 2045 | 64.55 |
| Lupranol ® 2030 | 6.20 |
| Lupranol ® 2047 | 5.00 |
| Lupragen ® N201 | 0.20 |
| VP 9199 | 0.45 |
| B 8680 | 0.20 |
| Systol ® T 131 | 5.00 |
| Melamine | 15.00 |

While stirring, 0.6 pbw of Lupranat® M20A were added and the mixture was stirred for 10 minutes. After 30 minutes, the component was finished by addition of 3.1 pbw of water and 0.3 pbw of Lupranol® N211. A flexible polyurethane foam was produced using 61 pbw of the NCO prepolymer as described in Example 1 (Table 1).

EXAMPLE 3

| 0.4 pbw of ethylenediamine were added to 96.6 pbw of a component comprising | |
|---|---|
| Constituent | pbw |
| Lupranol ® 2045 | 65.55 |
| Lupranol ® 2030 | 6.20 |
| Lupranol ® 2047 | 4.00 |
| Lupragen ® N201 | 0.20 |
| VP 9199 | 0.45 |
| B 8680 | 0.20 |
| Systol ® T 131 | 5.00 |
| Melamine | 15.00 |

While stirring, 0.7 pbw of Lupranat® M20 A was added. After stirring for 10 minutes, 3.1 pbw of water and 0.3 pbw of Lupragen® N211 were added and the mixture was stirred further for 10 minutes.

A flexible polyurethane foam was produced using 61 pbw of an NCO-containing prepolymer as described in Example 1 (Table 1).

EXAMPLE 4

| 0.5 pbw of diaminocyclohexane was added to 91.8 pbw of a component comprising | |
|---|---|
| Constituent | pbw |
| Lupranol ® 2045 | 71.55 |
| Glycerol | 1.20 |
| Lupranol ® 2047 | 3.00 |
| Lupragen ® N201 | 0.20 |
| VP 9199 | 0.45 |
| B 8680 | 0.40 |
| Melamine | 15.00 |

0.8 pbw of Lupranat® M20A, dissolved in 5 pbw of Systol® T 131 was added while stirring to the above mixture. The resulting mixture was stirred for 10 minutes to complete the reaction. 3.1 pbw of water and 0.1 pbw of Lupragen® N211 were then stirred in.

A flexible polyurethane foam was produced using 66.8 pbw of an NCO-containing prepolymer as described in Example 1 (Table 1).

EXAMPLE 5

0.5 pbw of 2,2'-dimethyl-4,4'-methylenebiscyclohexylamine and 0.1 pbw of diethanolamine were added to 96.6 pbw of a component comprising

| Constituent | pbw |
|---|---|
| Lupranol ® 2045 | 66.55 |
| Lupranol ® 2030 | 6.20 |
| Lupranol ® 2047 | 3.00 |
| Lupragen ® N201 | 0.20 |
| VP 9199 | 0.45 |
| B 8680 | 0.20 |
| Systol ® T 131 | 5.00 |
| Melamine | 15.00 |

While stirring, 0.9 pbw of Lupranat® M20A were added thereto. After stirring for 10 minutes, 3.1 pbw of water and 0.3 pbw of Lupragen® N211 were added. The mixture was stirred further for 10 minutes.

A polyurethane foam was produced using 61.2 pbw of an NCO-containing prepolymer as described in Example 1 (Table 1).

EXAMPLE 6

97.2 pbw of a component comprising

| Constituent | pbw |
|---|---|
| Lupranol ® 2045 | 69.80 |
| Lupranol ® 2047 | 1.00 |
| Polycat ® 12 | 0.40 |
| Dabco ® | 0.20 |
| B 8701 | 0.30 |
| Systol ® T 131 | 5.50 |
| Melamine | 20.00 |

Polycat 12®, Dabco®—amine catalysts (Air Products) were admixed with 0.25 pbw of 2,2'-dimethyl-4,4'-methylenebiscyclohexylamine and intensively mixed. After addition of 0.19 pbw of tolylene diisocyanate (TP 80), the mixture was stirred for 10 minutes. After 30. minutes, 2.8 pbw of water were added. A flexible polyurethane foam was produced using 55 pbw of the NCO prepolymer as described in Example 1 (Table 1).

EXAMPLE 7

97.2 pbw of the polyol component from Example 6 were admixed with 0.25 pbw of 2,2'-dimethyl-4,4'-methylenebiscyclohexylamine and intensively mixed. After addition of 0.4 pbw of an NCO-containing prepolymer as described in Example 1, the mixture was stirred for minutes. After 30 minutes, 2.8 pbw of water were added. The component thus obtained was reacted with 55 pbw of the NCO prepolymer as described in Example 1 to give a flexible polyurethane foam (Table 1).

In Table 1, the storage stability of the A components and the burning behavior of the resulting flexible foams are compared with one another.

Table 1: Characterization of the A component and the burning behavior

| Property | Ex. 1 | Ex. 2 | Ex. 3 | Ex. 4 | Ex. 5 | Ex. 6 | Ex. 7 |
|---|---|---|---|---|---|---|---|
| Storage stability (days) | 1 | >90 | >90 | >90 | >90 | >90 | >90 |
| Burning behavior*) | + | + | + | + | + | + | + |

*)Crib 5: British Standard 5852 part 2 (+ = passed)

EXAMPLE 8

70 pbw of Lupranol® 2045, 30 pbw of melamine, 0.05 pbw of dimethylethanolamine and 0.5 pbw of 2,2'-dimethyl-4,4'-methylenebiscyclohexylamine were mixed with one another by stirring for minutes. 0.54 pbw of Lupranat® MI was then added dropwise at a stirring speed of 1800 rpm. The mixture was mixed by stirring for minutes at room temperature. The melamine batch thus prepared (30% by weight of melamine in the polyol) was sufficiently storage-stable {>45 days*) and could to be mixed to form one component prior to processing.

* not tested for longer

We claim:

1. A process for producing flame-resistant polyurethane foams comprising reacting a) organic and/or modified organic isocyanates with b) at least one relatively high molecular weight compound containing at least two reactive hydrogen atoms and, optionally, c) low molecular weight chain extenders and/or crosslinkers in the presence of d) blowing agents, e) catalysts, f) a flame retardant and, optionally, g) further auxiliaries and/or additives, wherein the equivalence ratio of the NCO groups of component a) to the sum of reactive hydrogen atoms of components b) and c) is 0.8–1.25:1 and said flame retardant comprises melamine in combination with at least one primary and/or secondary amine selected from the group consisting of 2,2-dimethyl-4,4'-methylenebiscyclohexylamine, coconut fatty amine and N-oleylpropylenediamine and at least one organic and/or modified organic isocyanate.

2. A process as claimed in claim 1, wherein the melamine is added to a polyol component comprising component b), then at least one amine is mixed in and subsequently at least one organic and/or modified organic isocyanate is introduced.

3. A process as claimed in claim 1, wherein the proportion of melamine in the polyol component is from 1 to 50 percent by weight.

4. A process as claimed in claim 1, wherein the particle size of melamine is from 1 to 100 μm.

5. A process as claimed in claim 1, wherein the amines comprise primary and/or secondary amines.

6. A process as claimed in claim 1, wherein the amines comprise aliphatic and/or cycloaliphatic amines.

7. A process as claimed in claim 1, wherein the amines are used in amounts of from 0.05 to 5 percent by weight, based on the weight of the polyol component.

8. A process as claimed in claim 1, wherein the organic and/or modified organic isocyanates comprise aromatic isocyanates.

9. A process as claimed in claim 1, wherein the organic and/or modified organic isocyanates comprise prepolymers containing NCO groups.

10. A process as claimed in claim 1, wherein the organic and/or modified organic isocyanates are used in amounts of from 0.05 to 5 percent by weight, based on the weight of the polyol component.

11. A process for producing flame-resistant polyurethane foams comprising reacting a) organic and/or modified organic isocyanates with b) a polyol component comprising at least one relatively high molecular weight compound containing at least two reactive hydrogen atoms and a flame retardant, and, optionally, low molecular weight chain extenders and/or crosslinkers in the presence of blowing agents, catalysts, and further auxiliaries and/or additives, wherein the equivalence ratio of the NCO groups of component a) to the sum of reactive hydrogen atoms of components b) and c) is 0.8–1.25:1 and said flame retardant comprises melamine in combination with at least one primary and/or secondary amine selected from the group consisting of 2,2-dimethyl-4,4'-methylenebicyclohexylamine, coconut fatty amine and N-oleylpropylenediamine and at least one organic and/or modified organic isocyanate.

12. A process as claimed in claim 11, wherein the melamine is added to a polyol component comprising component b), then at least one amine is mixed in and subsequently at least one organic and/or modified organic isocyanate is introduced.

13. A process as claimed in claim 11, wherein the proportion of melamine in the polyol component is from 1 to 50 percent by weight.

14. A process as claimed in claim 11, wherein the particle size of melamine is from 1 to 100 $\mu$m.

15. A process as claimed in claim 11, wherein the amines comprise primary and/or secondary amines.

16. A process as claimed in claim 11, wherein the amines comprise aliphatic and/or cycloaliphatic amines.

17. A process as claimed in claim 11, wherein the amines are used in amounts of from 0.05 to 5 percent by weight, based on the weight of the polyol component.

18. A process as claimed in claim 11, wherein the organic and/or modified organic isocyanates comprise aromatic isocyanates.

19. A process as claimed in claim 11, wherein the organic and/or modified organic isocyanates comprise prepolymers containing NCO groups.

20. A process as claimed in claim 11, wherein the organic and/or modified organic isocyanates are used in amounts of from 0.05 to 5 percent by weight, based on the weight of the polyol component.

* * * * *